United States Patent
Tharp

(10) Patent No.: US 7,876,539 B2
(45) Date of Patent: Jan. 25, 2011

(54) ELECTRICAL APPARATUS WITH CURRENT DAMPENING DEVICE

(75) Inventor: Bill Tharp, Ashland, OH (US)

(73) Assignee: Pentair Pump Group, Inc., Golden Valley, MN (US)

( * ) Notice: Subject to any disclaimer, the term of this patent is extended or adjusted under 35 U.S.C. 154(b) by 475 days.

(21) Appl. No.: 11/585,421

(22) Filed: Oct. 23, 2006

(65) Prior Publication Data

US 2008/0094763 A1    Apr. 24, 2008

(51) Int. Cl.
 *H02H 3/16* (2006.01)
(52) U.S. Cl. ............... 361/42; 361/59; 340/650; 318/434; 318/432; 324/500
(58) Field of Classification Search ............... 361/31, 361/42, 43, 44, 45, 91.2, 93.1, 57; 323/267; 318/434; 417/1, 321; 324/500, 509, 525, 324/521, 511
See application file for complete search history.

(56) References Cited

U.S. PATENT DOCUMENTS

| | | | | |
|---|---|---|---|---|
| 3,668,469 A | * | 6/1972 | Lee ............... | 361/46 |
| 3,754,649 A | * | 8/1973 | Palubniak et al. ........ | 604/6.06 |
| 3,836,821 A | * | 9/1974 | Wahlgren et al. ......... | 361/45 |
| 4,020,394 A | * | 4/1977 | Potash ................ | 361/45 |
| 4,150,411 A | * | 4/1979 | Howell ................ | 361/45 |
| 4,216,515 A | * | 8/1980 | Van Zeeland ........... | 361/45 |
| 4,227,266 A | * | 10/1980 | Russell ............... | 4/496 |
| 4,979,070 A | * | 12/1990 | Bodkin ............... | 361/42 |
| 4,996,477 A | * | 2/1991 | Keeler et al. .......... | 324/772 |
| 5,055,961 A | | 10/1991 | Wiblin et al. | |
| 5,313,358 A | | 5/1994 | Severinsky | |
| 5,793,587 A | * | 8/1998 | Boteler ............... | 361/42 |
| 5,963,406 A | * | 10/1999 | Neiger et al. .......... | 361/42 |
| 6,128,169 A | * | 10/2000 | Neiger et al. .......... | 361/42 |
| 6,195,241 B1 | * | 2/2001 | Brooks et al. .......... | 361/42 |
| 6,339,525 B1 | * | 1/2002 | Neiger et al. .......... | 361/42 |
| 6,407,893 B1 | * | 6/2002 | Neiger et al. .......... | 361/42 |
| 6,891,303 B2 | * | 5/2005 | Leijon et al. .......... | 310/196 |
| 7,423,854 B2 | * | 9/2008 | Gandolfi et al. ........ | 361/42 |
| 7,484,515 B1 | * | 2/2009 | Bluestone et al. ....... | 134/108 |
| 7,639,461 B2 | * | 12/2009 | DiSalvo et al. ......... | 361/42 |
| 2005/0248390 A1 | | 11/2005 | Frech et al. | |

* cited by examiner

*Primary Examiner*—Rita Leykin
(74) *Attorney, Agent, or Firm*—Greenberg Traurig, LLP

(57) ABSTRACT

Various electrical apparatuses which include a current dampening device are disclosed. In one embodiment, an electrical apparatus is provided which includes a motor and a switch having an "on" position and an "off" position to control the operation of the motor. A current dampening device is connected in parallel with the motor downstream from the switch to dampen transient current. In another embodiment a ground fault circuit interrupter (GFCI) is electrically connected to the motor upstream from the switch.

15 Claims, 4 Drawing Sheets

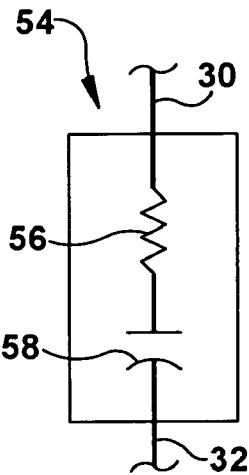
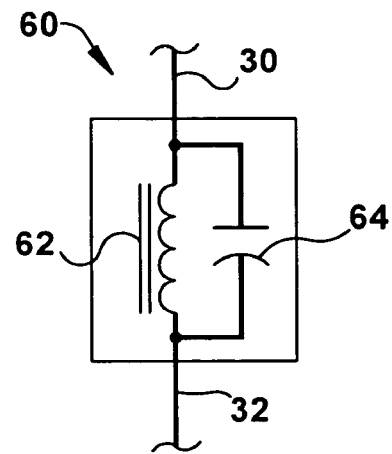
Fig. 5    Fig. 6
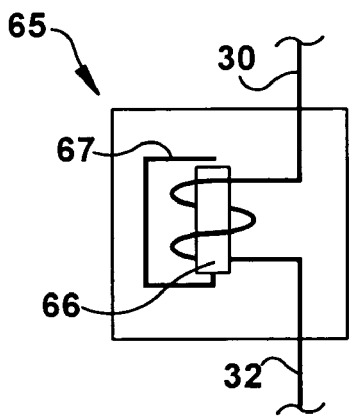
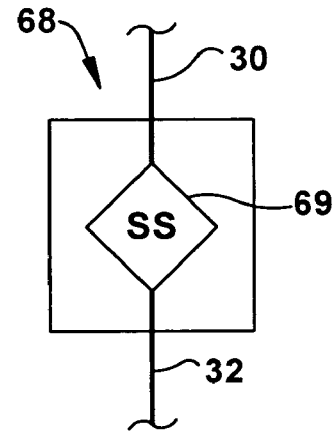
Fig. 7    Fig. 8
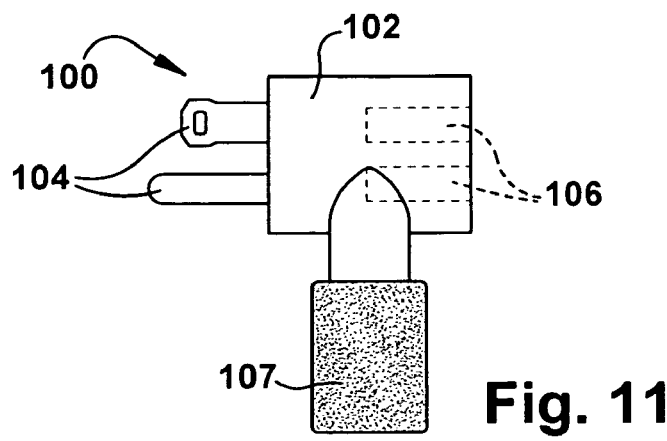
Fig. 11

ELECTRICAL APPARATUS WITH CURRENT DAMPENING DEVICE

FIELD OF THE INVENTION

The present invention is in the general field of electrical apparatuses having a motor and a switch to operate the motor.

BACKGROUND

Electrical apparatuses, for example electrical equipment, electrical appliances, etc., have motors that drive their operation. Many electrical apparatuses have a motor that operates continuously while others have motors that are designed to operate intermittently for the functional purpose of their use. For example, a sump pump is one such electrical apparatus includes a motor that cycles on and off based on water level and a control mechanism that senses the water level. The control mechanism turns on the motor when it receives a signal that water reaches a predetermined level in a sump well, for example, and turns off the motor when it receives a signal that the water recedes to a lower level. As another example, a thermostat of a freezer controls a compressor motor that provides cold air to the freezer. The control mechanism of the freezer turns on the compressor motor when the temperature of the thermostat is greater than a desired set-point temperature, and the control mechanism turns off the motor when the freezer cools to the desired temperature, which is typically lower than the set-point temperature.

Electrical apparatuses having alternating current (AC) motors are plugged into an AC outlet having a ground fault circuit interrupter (GFCI) or a GFCI as a component of the electrical apparatus and located upstream of the motor for safety. A problem can exist, however, where the GFCI randomly trips, or breaks its circuit contacts, unbeknownst to the user. Any motor shutdown in an electrical apparatus in which the motor runs continuously is typically noticed. For example, when a motor of a swimming pool pump which otherwise normally runs continuously shuts down, it is likely to be noticed sooner than the shutdown of a motor in an electrical apparatus which cycles on and off. In a motor which cycles on and off, it may be difficult to know whether the GFCI has been tripped or whether the motor is in the "off" cycle of operation. Once it has been discovered that the GFCI has been tripped, the GFCI can be reset. However, prior to resetting the GFCI and depending upon the elapsed time, expensive damage may result. For example, in the electrical apparatuses described above, a tripped motor of a sump pump may result in a flooded sump well or living area and a tripped motor of a freezer may result in spoiled food.

SUMMARY

The present invention provides for an electrical power circuit which powers an electrical apparatus that includes a motor and a switch having an "on" position and an "off" position to control the operation of the motor. The electrical apparatus also includes a current dampening device electrically connected in parallel with the motor between the motor and the switch. In another embodiment the electrical apparatus further includes a ground fault circuit interrupter (GFCI) electrically connected to the motor between the power source and the switch.

In another embodiment the present invention provides for a sump pump which includes a motor, a float switch having an "on" position and an "off" position to control the operation of the motor, and a current dampening device electrically connected in parallel to the motor, between the motor and the switch.

BRIEF DESCRIPTION OF THE DRAWINGS

The various embodiments of the present invention can be understood with reference to the following drawings. The components in the drawings are not necessarily to scale. Also, in the drawings, like reference numerals designate corresponding parts throughout the several views.

FIG. 5 is an electrical schematic of a current dampening circuit of the current dampening device of FIG. 1, in which the current dampening circuit includes a resistor and a capacitor, according to an embodiment of the invention;

FIG. 6 is an electrical schematic of a current dampening circuit of the current dampening device of FIG. 1, in which the current dampening circuit includes a capacitor and an inductor, according to an embodiment of the invention;

FIG. 7 is an electrical schematic of a current dampening circuit of the current dampening device of FIG. 1, in which the current dampening circuit includes an inductor and an electro-mechanical device, according to an embodiment of the invention;

FIG. 8 is an electrical schematic of a current dampening circuit of the current dampening device of FIG. 1, in which the current dampening circuit includes a solid state device, according to an embodiment of the invention;

FIG. 11 is an illustration of a current dampening device having a plug and a receptacle, according to an embodiment of the invention.

DESCRIPTION

Figure 1:
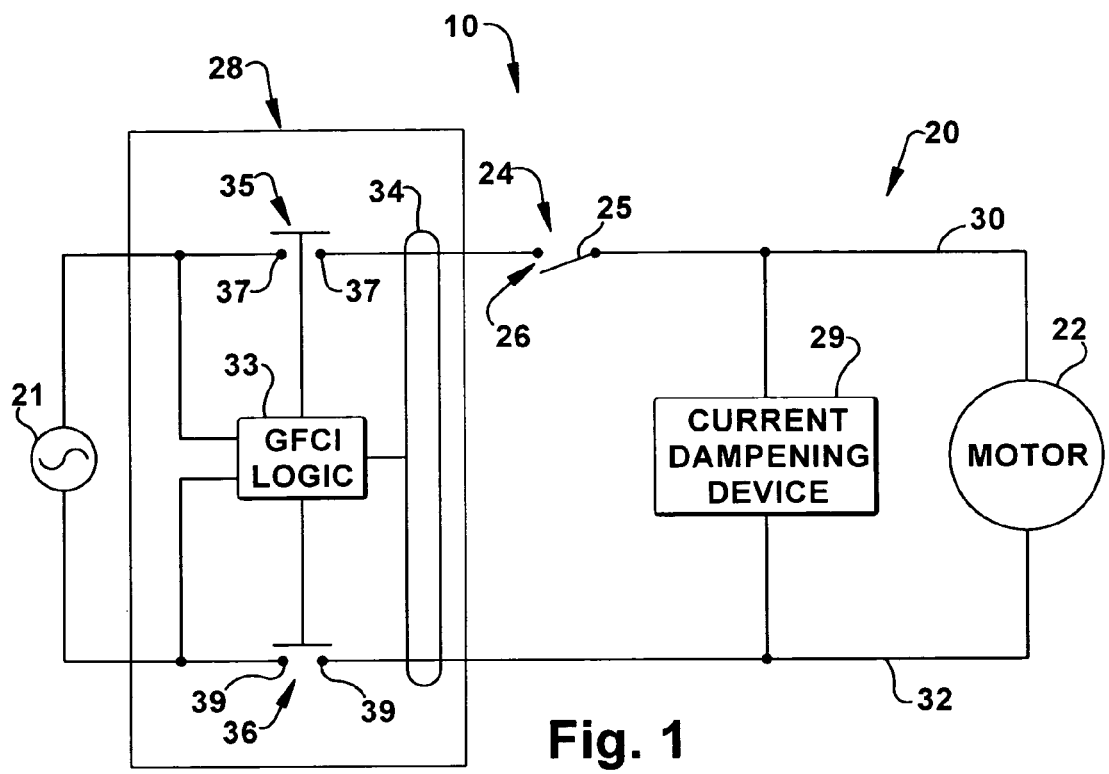
FIG. 1 is an electrical schematic of an electrical circuit that includes an electrical apparatus having a motor and a current dampening device, according to an embodiment of the invention.

FIG. 1 is schematic showing an electrical power circuit 10 which powers an electrical apparatus 20 connected to a power source 21. The term "electrical apparatus" as used herein refers to an electric or an electronic device. The electrical apparatus 20 can be one of many electrical devices, for example a sump pump apparatus, or one of many appliances, for example. Electrical apparatus 20 includes a motor 22 and a switch 24 electrically connected to power source 21 and which operate by electrical energy. Switch 24 is upstream from motor 22, electrically connected in series between the motor 22 and power source 21 which is an alternating current supply. Switch 24 has an "on" position and an "off" position to control the operation of the motor 22. FIG. 1 shows switch 24 open and movable contact 25 disconnected from stationary contact 26.

Electrical apparatus 20 includes a current dampening device 29 which is electrically connected in parallel with the motor 22, and is located between the motor 22 and the switch 24. When the switch 24 opens, the current dampening device 29 provides a complete circuit that dampens transient current which is released by the motor 22. Although not wishing to be bound by any particular theory, it is believed that transient current is a result of electro-mechanical forces of the motor, and that transient current from the motor may often be present after the motor switch 24 is turned off.

In another embodiment, the electrical apparatus 20 can also include a ground fault circuit interrupter (GFCI) 28 that is electrically connected with the current dampening device 29 and the motor 22. The GFCI 28 is located between the power source 21 and switch 24 and can detect an imbalance in the alternating current in the at least two current line conductors 30 and 32 of the motor 22. As is well known to those of ordinary skill in the art, a GFCI is employed as a safety device in an electrical circuit. The GFCI 28 disconnects electrical power from the power source 21 to the motor 22 when the imbalance is registered by transformer 34 across line conductors 30, 32. The transformer 34 detects when the imbalance of current across the current conductors 30, 32 is large enough to cause an unsafe situation and sends a signal to the GFCI logic 33. The GFCI logic 33 which controls the opening and closing of the switches 35 and 36 positioned in series with the current conductors 30 and 32, respectively, which connect to motor 22. When the GFCI logic determines that there is an electrical imbalance between the two current conductors 30, 32 above a predetermined threshold, for example 5-6 milli-amps, and the GFCI switches 35, 36 are opened and pulled away from stationary contacts 37, 39. The electrical circuit is broken between the power source 21 and the motor 22, thereby causing the motor 22 to shut down.

As mentioned above, the motor 22 can cycle on and off during normal operation of the electrical apparatus 10. To briefly summarize the intermittent operation of electrical apparatus 20, when the motor 22 is in the "on" cycle, movable contact 25 of switch 24 touches stationary contact 26 in the closed position and electrical current runs through current conductors 30, 32 between the motor 22 and the power source 21. When the motor is in the "off" cycle, contact is broken between movable contact 25 and stationary contact 26 and switch 24 opens. After the motor 22 shuts down, transient current released by the motor 22 is dampened by current dampening device 29 to a current level that is below the threshold trip level of the GFCI. Therefore, unstable current which would otherwise cause the GFCI 28 to break the circuit of electrical apparatus 20 with the power source 21 will be dampened by the current dampening device 29 and thereby allow the GFCI switches 35, 36 to remain closed, thereby preventing the GFCI 28 from tripping.

It should be understood, however, that the presence of the current dampening device 29 does not interfere or have effect on the intended function of the GFCI 28. That is, GFCI 28 located between power source 21 and current dampening device 29 will continue to detect a current imbalance along the current conductors 30, 32, and break the circuit between the motor 22 and power source 21 in the event that there is an electrical imbalance between the two current conductors 30, 32 above a predetermined threshold as described above.

The motor 22 of electrical apparatus 20 can range from about to 0.1 hp to about 2 hp, in some cases from about 0.5 hp to about 2 hp, and in other instances from about 0.5 hp to about 1.5 hp, and all ranges therebetween. The amount of current flowing through the various sizes of motors of the electrical apparatus 20 while running and switch 24 is in the "on" position ranges from about 1 ampere to about 20 amperes, and in some embodiments from about 3 amperes to about 15 amperes, and in yet another embodiment from about 5 amperes to about 12 amperes, and all ranges therebetween.

The two current conductors of electrical motor 22 includes a line 30 and neutral 32 in nominal 120 Volts, for example, and in another embodiment, two line conductors 30, 32 in nominal 230 Volts. It should be understood, however, that alternative voltage ratings can be contemplated and could be used based on the design of the electrical system.

Figure 2:
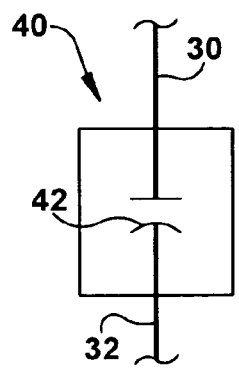
FIG. 2 is an electrical schematic of a current dampening circuit of the current dampening device of FIG. 1 in which the current dampening circuit includes a capacitor, according to an embodiment of the invention.
Figure 3:
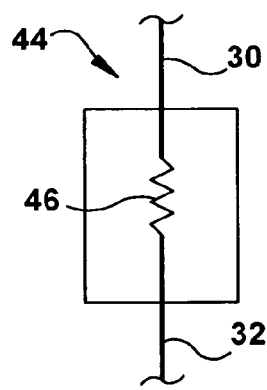
FIG. 3 is an electrical schematic of a current dampening circuit of the current dampening device of FIG. 1 in which the current dampening circuit includes a resistor, according to an embodiment of the invention.
Figure 4:
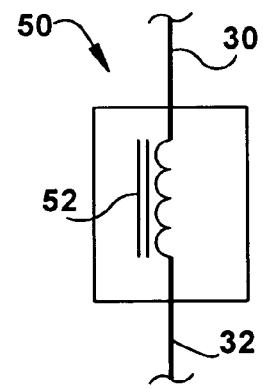
FIG. 4 is an electrical schematic of a current dampening circuit of the current dampening device of FIG. 1, in which the current dampening circuit includes an inductor, according to an embodiment of the invention.

In accordance with example embodiments of the present invention, FIGS. 2-8 show electrical schematics of various current dampening circuitry of a current dampening device, for example, current dampening device 29 shown in FIG. 1, connected in parallel with motor 22. FIG. 2 shows that the current conductors 30, 32 are connected to current dampening device 40 which includes a capacitor 42. FIG. 3 is a schematic illustration of current dampening device 44 which includes a resistor 46, and FIG. 4 is a schematic of dampening device 50 which includes an inductor 52. FIG. 5 illustrates current dampening device 54 which includes a resistor 56 and a capacitor 58 connected in series. FIG. 6 shows current dampening device 60 which includes an inductor 62 and a capacitor 64 arranged in parallel. In another example embodiment, FIG. 7 shows current dampening device 65 includes a coil 66 and armature 67 which make up an inductor. Residual energy which flows from motor 22 (FIG. 1) when switch 24 (FIG. 1) is opened will cause armature 67 to remain in contact with coil 66 to dampen the current. FIG. 8 shows a current dampening device 68 which includes a solid state device 69. Solid state devices include, but are not limited to, at least one of semi-conductors, capacitors, resistors, and combinations thereof.

Figure 9:
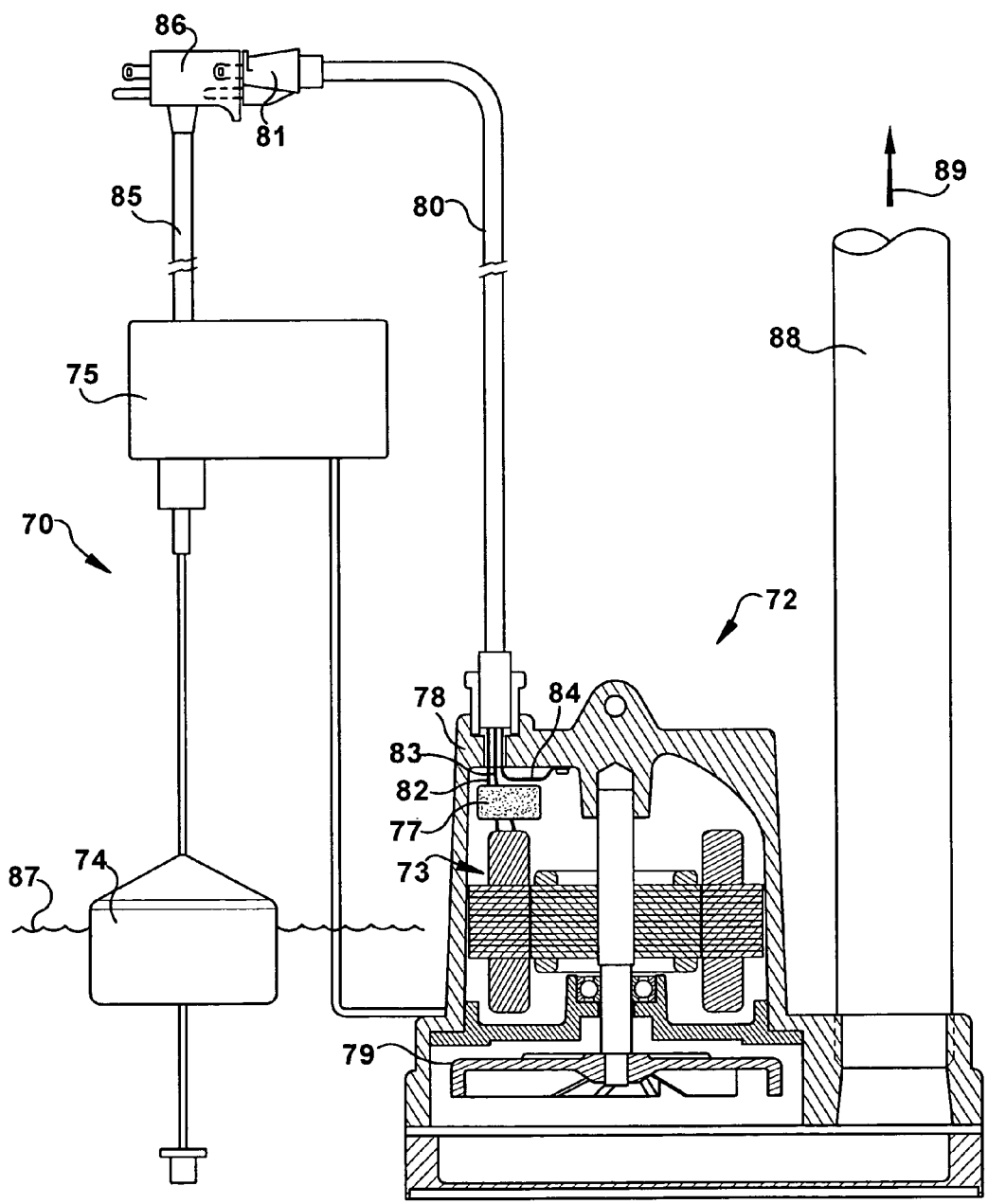
FIG. 9 is a schematic illustration of a sump pump apparatus which includes a motor and a current dampening device which is internal to the motor housing, according to an embodiment of the invention.

FIG. 9 is a schematic illustration of a sump pump apparatus 70 which includes a pump 72, a motor 73 which operates the pump, a float 74, and a float switch 75, according to an embodiment of the present invention. Switch 75 electrically connected in series between the motor 73 and a power source (not shown) which is an alternating current supply. The sump pump apparatus further includes a current dampening device 77 which is shown internal to the motor housing 78, however, the current dampening device 77 can also reside external to the motor housing. Current dampening device 77 is electrically connected in parallel with the motor 73, and is located between the motor 73 and the switch 75. Pump 72 has an electrical cord 80 with plug 81 which has a line conductor 82, and either a second line conductor or neutral 83 depending on the power source voltage, and a ground 84 which is shown connected to the housing 78. Float switch 75 is shown as also having a power cord 85 with plug 86 that receives electrical cord 80 of pump 72. Alternatively, float switch 75 can be internally wired directly to pump 72 such that a single power cord 80 can be plugged directly to a power source (not shown) external to the sump pump apparatus.

Float switch 75 has an "on" and "off" position which activates motor 73 to drive impeller 79 of pump 72. During operation, the float switch 75 causes the motor 73 to cycle on and off based on the water level 87 that is inside of a sump well. When the water level 87 reaches a pre-determined height in the well, then the float 74 moves to establish an electrical circuit that turns the motor 72 to the "on" position.

The energy from the motor 72 rotates the impeller 79 and pumps water through pipe 88 from the sump well in the direction indicated by arrow 89. When the water level 87 recedes, the float switch 75 opens to break the circuit and the motor 72 is turned off. Current dampening device 77 dampens transient current that flows from the motor 72, thereby allowing the current level to remain below the threshold of a GFCI, for example 5 to 6 milliamps, if present, as current travels through electrical cord 80. As mentioned above, a GFCI can be located along electrical cords 80 and 85, for example, or at a location external to the sump pump apparatus 70, according to alternative embodiments of the invention.

Figure 10:
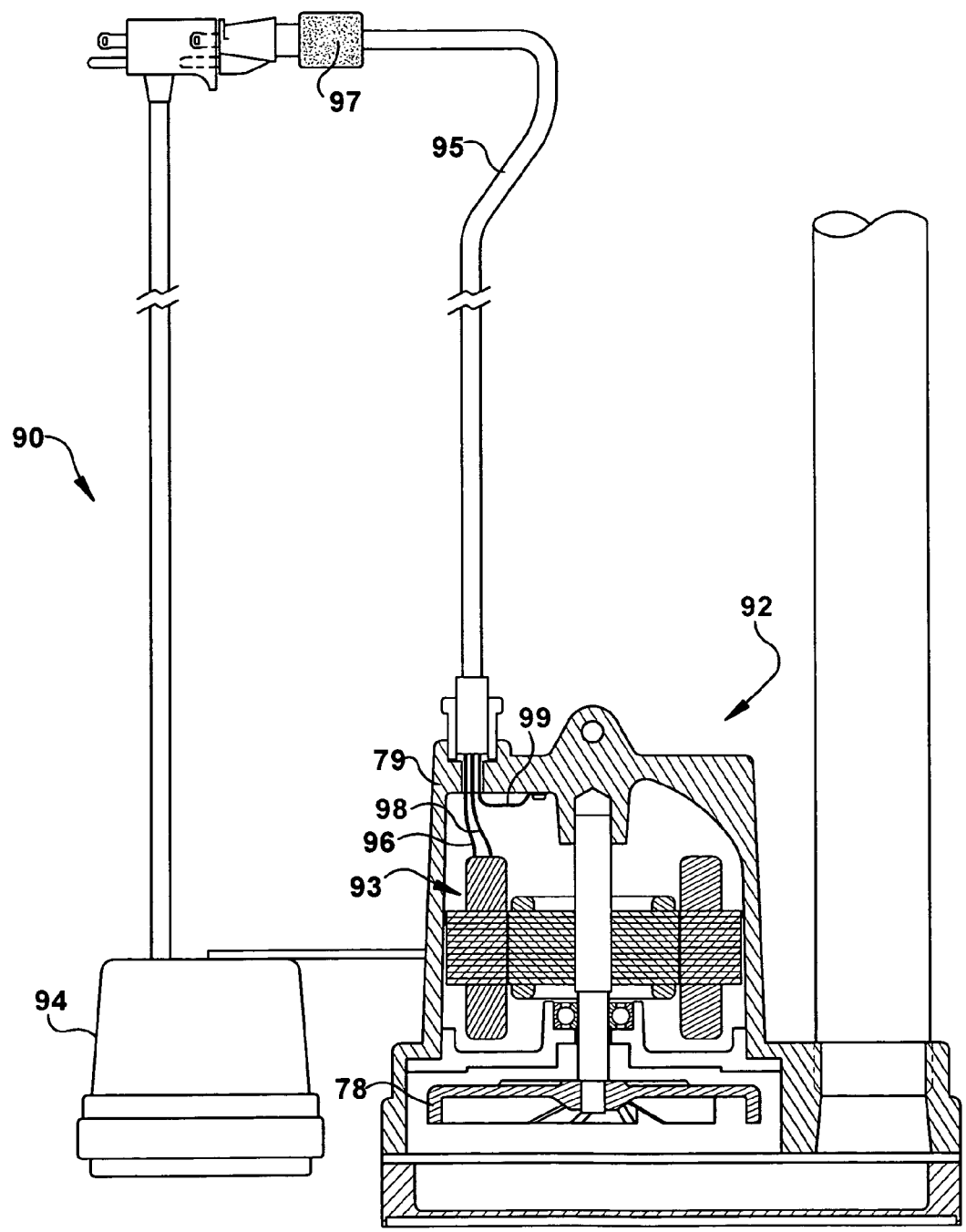
FIG. 10 is a schematic illustration of a sump pump apparatus which includes a motor and a current dampening device which is connected to the power cord 95 of the motor, according to an embodiment of the invention.

In another embodiment of the present invention, FIG. 10 illustrates a sump pump apparatus 90 which includes a pump 92, a motor 93, and a diaphragm switch 94. Diaphragm switch 94 is electrically connected in series between the motor 93 and a power source. The sump pump apparatus includes a current dampening device 97 which is electrically connected in parallel with the motor 93, and is located between the motor 93 and the diaphragm switch 94. Power cord 95 includes at least two current conductors, for example a line 97, neutral 98, and ground 99. The current dampening device 97 is connected in parallel to the current conductors 96, 98, at a location along the power cord 95 and external to the pump housing. In another embodiment, the sump pump can further include a ground fault circuit interrupter (not shown) that is located between a power source and the diaphragm switch 94 and electrically connected in series with current dampening device.

FIG. 11 shows a piggyback connector 100 that can be used within one of several electrical apparatuses, for example, sump pump apparatus 72 (FIG. 9) and sump pump apparatus 92 (FIG. 10) described above. The body 102 of piggyback connector 100 includes a male plug 104 and a female receptacle 106. Body 102 is in physical communication with current dampening device 107. That is, for example, the current dampening device 107 may be integral with body 102 of the piggyback connector 100 or attached to the body 102. Therefore, when the piggyback connector 100 is connected to an electrical apparatus, for example sump pump apparatus 70 (FIG. 9), the piggyback connector 100 is disposed between the float switch 75 and the motor 72. For example, the piggyback connector 100 can connect to both the float switch 75 and the motor 72 such that the male plug 104 of the piggyback connector 100 connects to plug 86 of float switch 75, and the female receptacle 106 connects to plug 81 of the motor 72.

The present invention is further illustrated by the following non-limiting examples. Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Various current dampening devices having current dampening circuits described below were electrically connected to a sump pump apparatus having a Hydromatic brand DA1 (⅓ horsepower) motor and a piggy-back float switch which turned the pump on and off. The current dampening device was connected between the motor and the switch according to the electrical circuit arrangement of FIG. 1. In each example, the sump pump apparatus was connected to a duplex 120V ground fault circuit interrupter (GFCI). The motor was left to cycle several thousand cycles to determine whether the ground fault circuit interrupter switched off.

The sump pumps were cycled in test tanks in which water in an elevated tank was gravity fed into a sump pump tank below. The time for the sump pump to pump the tank down to the level at which the float switch turned the pump off was approximately 10 seconds. The time to refill the tank to the level at which the float switch resumed pumping was approximately 60 seconds, for a total cycle time of about 70 seconds. This resulted in approximately 1200 cycles per day. The testing is summarized in Table I below.

Control

A sump pump having a Hydromatic brand DA1 (⅓ horsepower) motor was cycled for 24,000 cycles without the presence of a current dampening device. The sump pump tripped the ground fault circuit interrupter (GFCI) every one to two days and the GFCI was re-set each time the tripping occurred.

Example 1

A current dampening device, which was a cycle counter electro-mechanical actuator, was electrically connected between a Hydromatic brand DA1 (⅓ horsepower) motor and a control float switch of a sump pump apparatus to determine whether the current dampening device would prevent the GFCI from tripping. The sump pump ran for four weeks (33,000 cycles) without tripping. Thereafter, the cycle counter electro-mechanical actuator was removed from the sump pump and cycling was resumed. The same sump pump then began to trip the GFCI periodically.

Example 2

The test described in Example 1 above was repeated using the same equipment set-up except that the motor was replaced with a second motor of the same model. The sump pump ran for four weeks (33,000 cycles) without tripping the GFCI. The current dampening device was then removed from the sump pump apparatus, and cycling was resumed, but the sump pump began tripping the GFCI again.

Example 3

The same sump pump apparatus set-up was used as in Examples 1 and 2 above except that the current dampening device was a 0.47 uf capacitor which was connected to the motor and the control float switch, as shown in FIG. 2. The sump pump ran for four weeks (33,000) without tripping the GFCI.

Example 4

The above procedure of Examples 1-3 was repeated using a current dampening device having a 0.68 uf-47 ohm resistor/capacitor (RC network) connected between the motor and the control float switch, as shown in FIG. 5. The sump pump also ran for four weeks (33,000) without tripping the GFCI.

Example 5

The above procedure of Examples 1-4 was repeated using a current dampening device having a six hundred (600) Ohm resistor that was connected between the motor and the control float switch, as shown in FIG. 3. The result was that the sump pump ran for five weeks (42,000 cycles) without tripping the GFCI.

TABLE I

| | Current Dampening Device | Cycles |
|---|---|---|
| Control | None | 24,000 |
| Example 1 | Cycle Counter Electro-Mechanical Actuator | 33,000 |
| Example 2 | Cycle Counter Electro-Mechanical Actuator | 33,000 |
| Example 3 | 0.47 uf Capacitor | 33,000 |
| Example 4 | 0.68 uf-47 ohm RC Network | 33,000 |
| Example 5 | 600 Ohm Resistor | 42,000 |

It will be appreciated by persons skilled in the art that numerous variations and/or modifications may be made to the invention as described in the specific embodiments without departing from the spirit and scope of the invention as broadly described. The present embodiments are, therefore, to be considered in all respects as illustrative and not restrictive. Other features and aspects of this invention will be appreciated by those skilled in the art upon reading and comprehending this disclosure. Such features, aspects, and expected variations and modification of the reported results and examples are clearly within the scope of the invention where the invention is limited solely by the scope of the following claims.

The invention claimed is:

1. A sump pump apparatus for use with a ground fault circuit interrupter, the sump pump apparatus comprising:
   a motor;
   a float switch electrically connected to the motor, the float switch having an on position and an off position to control the operation of the motor, the ground fault circuit interrupter connected to the float switch, the ground fault circuit interrupter including at least one ground fault circuit interrupter switch;
   a motor switch connected to a line conductor connected to the motor, the motor switch being open when the motor shuts down; and
   a current dampening device electrically connected in parallel to the motor between the motor and the float switch, the current dampening device helping prevent false tripping of the ground fault circuit interrupter, the current dampening device dampening transient current released by the motor after the motor shuts down and the motor switch is open to a current level that is below a threshold trip value of the ground fault circuit interrupter so that the at least one ground fault circuit interrupter switch remains closed.

2. The sump pump apparatus of claim 1, wherein the sump pump comprises a float that activates the float switch to the on and the off position to activate the motor.

3. The sump pump apparatus of claim 1, wherein the current dampening device comprises a current dampening circuit that comprises an electrical component selected from the group of an inductor, a resistor, and a capacitor.

4. The sump pump apparatus of claim 1, wherein the current dampening device comprises a solid state device.

5. The sump pump apparatus of claim 1, wherein the current dampening device of the sump pump apparatus is incorporated into a piggy-back plug comprising a male plug and a female receptacle.

6. The sump pump apparatus of claim 1, wherein the motor comprises an power cord for connection to a power source and the power cord comprises a neutral line and a line current conductor, and the current dampening device is connected to the power line and the neutral line of the cord.

7. The sump pump apparatus of claim 1, wherein:
   the motor comprises a housing, a power line for connection to a power source and a neutral line for connection to neutral; and
   the current dampening device is internal to the housing and connected to the power line and the neutral line.

8. The sump pump apparatus of claim 1, wherein the horsepower of the motor ranges from about 0.1 hp to about 2 hp, and the current through the electrical apparatus when the switch is in the "on" position ranges from about 1 amps to about 20 amps.

9. The sump pump apparatus of claim 1, further comprising: a sump pump having a float that activates the float switch to the "on" and the "off" position to activate the motor.

10. The sump pump apparatus of claim 1, wherein the current dampening device comprises an inductor.

11. The sump pump apparatus of claim 1, wherein the current dampening device comprises a resistor.

12. The sump pump apparatus of claim 1, wherein the current dampening device comprises a capacitor.

13. The sump pump apparatus of claim 1, wherein the current dampening device comprises a capacitor and a resistor connected in series.

14. The sump pump apparatus of claim 1, wherein the current dampening device comprises an inductor and a capacitor arranged in parallel.

15. The sump pump apparatus of claim 1, wherein the current dampening device comprises a coil.

* * * * *